(12) United States Patent
Fourney

(10) Patent No.: US 7,886,892 B2
(45) Date of Patent: Feb. 15, 2011

(54) CONVEYOR BELT HAVING ROLLERS AS TENSILE MEMBERS

(75) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 631 days.

(21) Appl. No.: 11/735,029

(22) Filed: Apr. 13, 2007

(65) Prior Publication Data

US 2007/0181402 A1 Aug. 9, 2007

Related U.S. Application Data

(63) Continuation-in-part of application No. 11/627,132, filed on Jan. 25, 2007, now Pat. No. 7,461,739.

(60) Provisional application No. 60/762,227, filed on Jan. 26, 2006.

(51) Int. Cl.
*B65G 47/46* (2006.01)
(52) U.S. Cl. ............... 198/370.03; 198/779; 198/828; 198/827
(58) Field of Classification Search ................ 198/779, 198/370.03, 828, 827, 848, 835, 844.1
See application file for complete search history.

(56) References Cited

U.S. PATENT DOCUMENTS

| | | | | |
|---|---|---|---|---|
| 4,730,723 A | * | 3/1988 | Mossot | 198/827 |
| 6,070,711 A | * | 6/2000 | Murano et al. | 198/779 |
| 7,137,505 B2 | * | 11/2006 | Stebnicki et al. | 198/850 |
| 2006/0011454 A1 | | 1/2006 | Stebnicki et al. | |
| 2006/0144678 A1 | * | 7/2006 | Fandella | 198/851 |

OTHER PUBLICATIONS

International Search Report and Written Opinion, dated Aug. 7, 2008.

* cited by examiner

*Primary Examiner*—Gene Crawford
*Assistant Examiner*—Kavel Singh
(74) *Attorney, Agent, or Firm*—Thomas, Kayden, Horstemeyer & Risley, LLP

(57) ABSTRACT

A conveyor belt including a plurality of rollers that serve as tensile members for the conveyor belt. In some embodiments, the rollers include roller members that rotate about longitudinal shafts, wherein the roller shafts receive and transmit tensile forces along a longitudinal direction of the conveyor belt. In some embodiments, nothing exists between adjacent roller members across a width of the conveyor belt.

7 Claims, 6 Drawing Sheets

US 7,886,892 B2

CONVEYOR BELT HAVING ROLLERS AS TENSILE MEMBERS

CROSS-REFERENCE TO RELATED APPLICATIONS

This application is a continuation-in-part of copending U.S. nonprovisional application Ser. No. 11/627,132 entitled "Systems and Methods for Diverting Objects," filed Jan. 25, 2007, which claims priority to U.S. provisional application No. 60/762,227 entitled "Systems and Methods for a Variable Angle High-Speed Diverting Conveyor System," filed Jan. 26, 2006, both of which are hereby incorporated herein by reference in their entirety.

BACKGROUND

Conveyor belts sometimes include rollers that extend beyond at least the top surface of the belt. With such rollers, objects conveyed by the belt can be diverted from the belt by driving the rollers in a chosen direction.

Conveyor belts of the type described above typically comprise modular belt body sections that are linked together and that support the rollers. For example, one body section can be provided for each row of rollers that extends across a width direction of the belt. Such body sections laterally surround their rollers such that a portion of the section, for example a length of plastic or metal, is positioned between each adjacent roller across the width of the belt. Although providing a viable means for supporting the rollers and providing structure to the belt, the body sections occupy space in the width direction of the belt and therefore limit the roller density that can be achieved. In other words, the presence of the body section lengths that lie between the rollers limits the extent to which the space between each adjacent roller can be minimized.

BRIEF DESCRIPTION OF THE DRAWINGS

The disclosed conveyor belts can be better understood with reference to the following drawings. The components in the drawings are not necessarily to scale.

DETAILED DESCRIPTION

Described in the following are conveyor belts in which rollers of the conveyor belts serve as tensile members in a longitudinal direction of the belts. In some embodiments, a conveyor belt comprises a plurality of transverse rows, each row including multiple rollers oriented such that their axes of rotation are generally aligned with the longitudinal direction of the belt. Each roller comprises a shaft about which a roller member of the roller can rotate, for example to laterally divert objects from the conveyor belt. In addition to supporting the roller members, the shafts receive and transmit the tensile forces applied to the conveyor belt along its length. Accordingly, when the conveyor belt is pulled in a given direction, for instance by a belt sprocket, the pulling forces are received and transmitted by the shafts as opposed to another belt component, such as a belt body section.

In the following, various embodiments of conveyor belts are disclosed. Although specific embodiments are presented, those embodiments are mere example implementations of the disclosed belts and it is noted that other embodiments are possible. All such embodiments are intended to fall within the scope of this disclosure.

Figure 1:
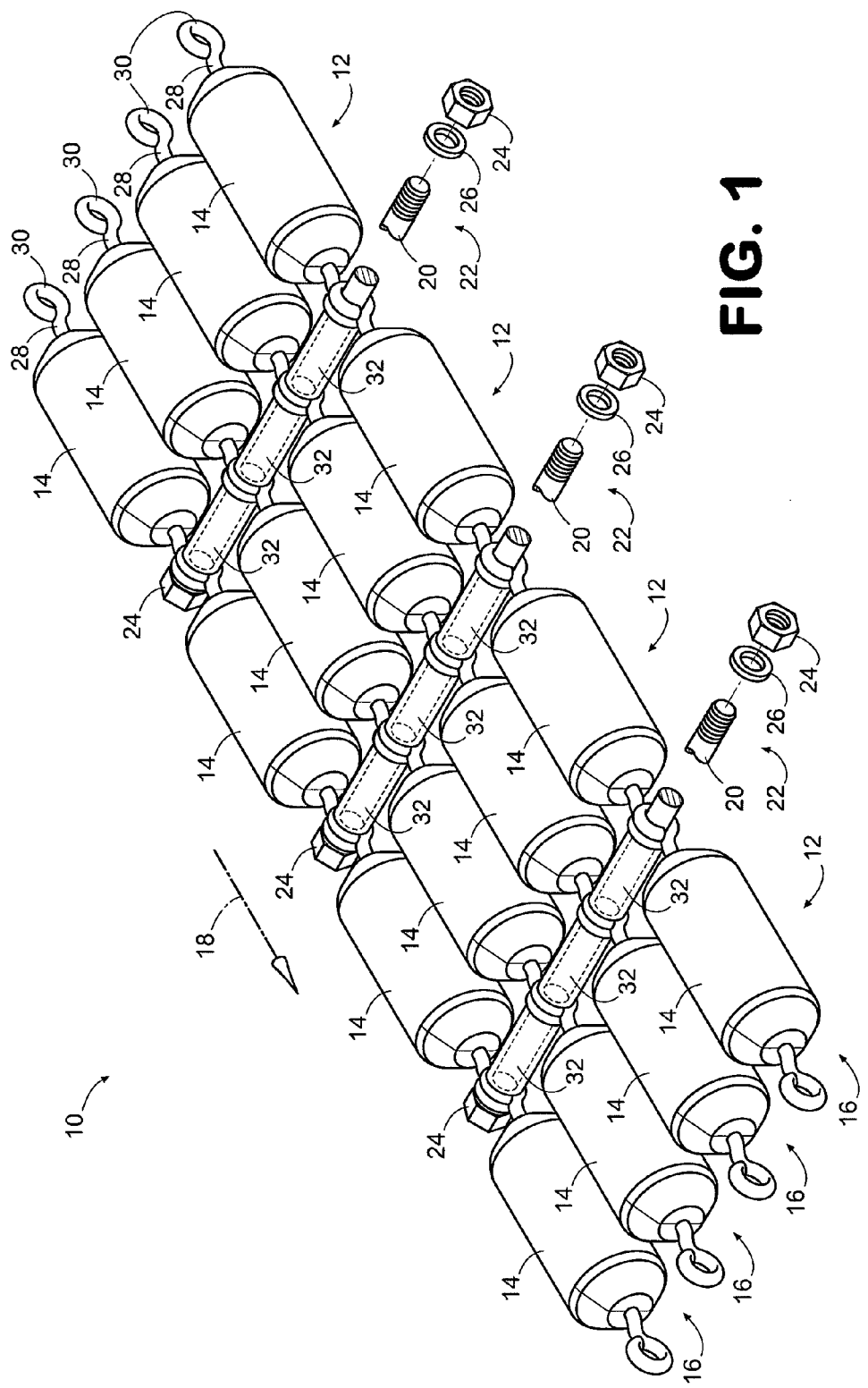
FIG. 1 is a perspective view of a first embodiment of a conveyor belt having rollers that serve as tensile members.

Turning to the figures, in which like numerals identify corresponding components, FIG. 1 illustrates a portion of a first embodiment of a conveyor belt 10. As indicated in FIG. 1, the conveyor belt 10 comprises a plurality of transverse rows 12 of rollers 14 that extend across the width of the belt. In at least some embodiments, the rollers 14 also align in columns 16 that extend along a length of the belt 10 parallel to a direction of belt travel identified by arrow 18 (i.e., the longitudinal direction of the belt). As indicated in FIG. 1, there are no conveyor body sections or other belt components in which the rollers 14 are mounted such that tensile forces imposed upon the conveyor belt 10 along its longitudinal direction in each row 12 are received and transmitted by the rollers alone. Moreover, no component of the belt 10 is positioned between adjacent rollers across the width of the belt. Specifically, no component lies within the gaps existing between the rollers 14 and defined by the outer surfaces of the rollers.

The conveyor belt 10 comprises a plurality of transverse shafts 20 that extend across the width of the belt and pivotally connect the various rows 12 of rollers 14 together such that those rows together form a continuous or "endless" belt. Accordingly, the transverse shafts 20 also receive and transmit tensile forces in the conveyor belt 10. In some embodiments, the shafts 20 comprise solid elongated rods composed of a metal or plastic material. For example, the shafts 20 can comprise steel rods. As shown in FIG. 1, the ends 22 of the shafts 20 can be threaded so as to be adapted to receive a mating threaded fastener 24, such as a nut. Furthermore, a washer 26 or other spacer element can be positioned between the fasteners 24 and the rollers 14 that they secure.

The transverse shafts 20 extend through openings provided in longitudinal shafts 28 of the rollers 14. In the embodiment of FIG. 1, the transverse shafts 20 are passed through openings formed by eyelets 30 provided at the ends of the roller shafts 28. In addition, the transverse shafts 20 extend through transverse spacers 32 that maintain a predetermined spacing of the roller shafts 28, and therefore the rollers 14 themselves. In some embodiments, the transverse spacers 32 comprise cylindrical collars made of a polymeric or metal material.

FIGS. 2-5 illustrate an example roller 36 that can be used in the conveyor belt 10 of FIG. 1. Beginning with the top view of FIG. 2, each roller 36 includes a roller member 38 that comprises a roller body 40 that is surrounded by an outer layer 42.

Figure 4:
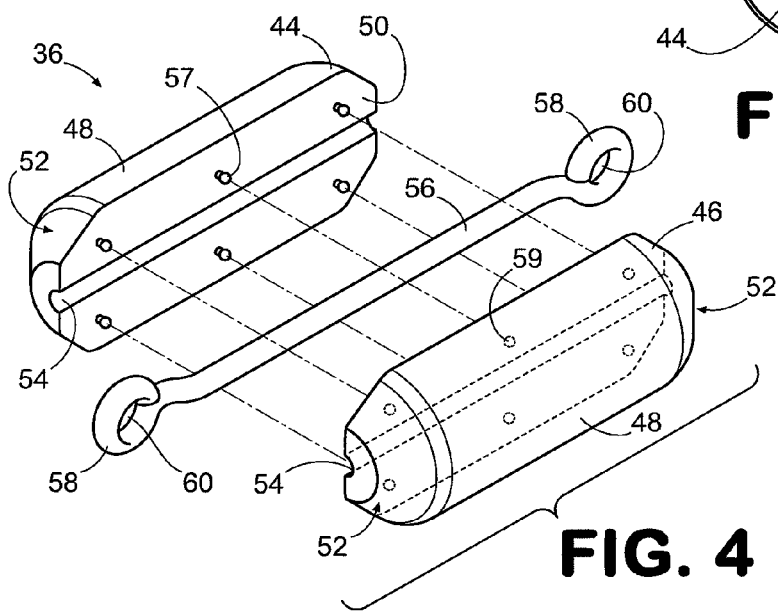
FIG. 4 is an exploded perspective view of the roller of FIG. 2, illustrating formation of a roller member prior to application of an outer layer.

As indicated in FIG. 4, the roller body 40 is a generally cylindrical member that, at least in some embodiments, is formed from two longitudinal halves 44 and 46, each comprising a rounded outer surface 48 and an at least partially planar inner surface 50 (only one inner surface explicitly identified in FIG. 4). Each end of each half 44, 46 forms a generally conical and/or rounded portion 52 such that when the two halves are joined, the roller body 40 has conical and/or rounded ends.

Provided on each roller body half 44, 46 is an elongated groove 54 that extends along the length of the roller body 40 and forms half of a passage adapted to receive a shaft 56. When formed, the passage defines a bearing surface that supports the roller body 40 as it rotates about the shaft 56. In some embodiments, each half 44, 46 includes connection elements that are used to, at least temporarily, connect the two halves to each other around the shaft 56. In the embodiment of FIG. 1, the connection elements comprise male connection elements (i.e., protrusions) 57 provided on roller body half 44 and female connection elements (i.e., openings) 59 provided on roller body half 46, wherein the female connection elements are adapted to receive the male connection elements in a snap-fit relationship.

Figure 2:
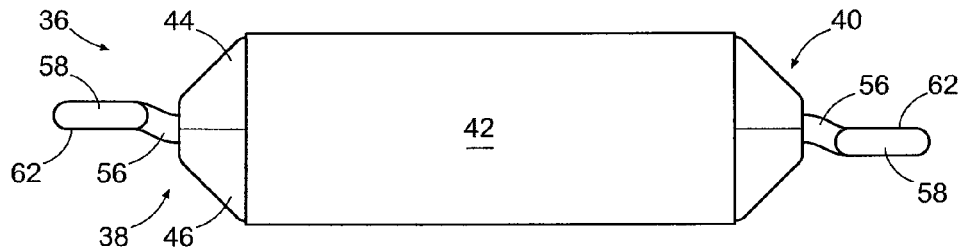
FIG. 2 is a top view of an embodiment of a roller that can be used in the conveyor belt of FIG. 1.
Figure 3:
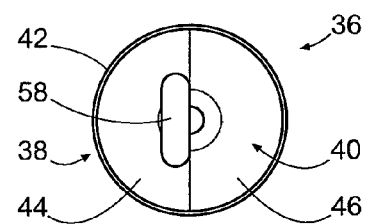
FIG. 3 is an end view of the roller of FIG. 2.

The shaft 56 comprises an elongated rod or tube having eyelets 58 provided at each end. The eyelets 58 define openings 60 that are adapted to receive the transverse shafts, such as shafts 20 shown in FIG. 1. As indicated most clearly in FIGS. 2 and 3, the eyelets 58 are offset relative to a longitudinal axis of the shaft 56. More particularly, as shown in FIG. 2, the eyelets 58 are offset or staggered in opposite lateral directions relative to the remainder of the shaft 56. Such an offset or staggered orientation facilitates alignment of the shaft 56 of each roller 36 with the longitudinal direction of the belt in which the roller is used. By way of example, the eyelets 58 are offset such that inner surface 62 of each of eyelet substantially lies in a plane in which the longitudinal axis of the shaft 56 lies. In such cases, the inner surfaces 62 of each shaft 56 also substantially lie in the same plane and the longitudinal axes of each roller 36 of a column of rollers extending in the longitudinal direction of the belt will generally align with each other.

Figure 5:
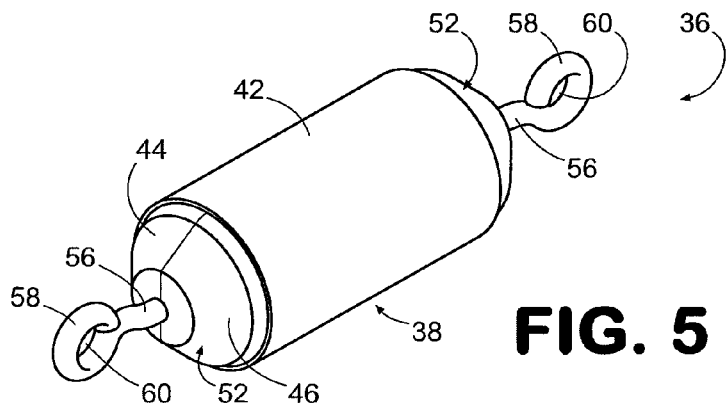
FIG. 5 is a perspective view of the roller of FIG. 2.

During manufacturing of the roller 36, the shaft 56 can be formed by bending the ends of a metal rod so as to create the eyelets 58 and their openings 60. The two roller body halves 44, 46 can be separately fabricated, for example, using an injection molding process in which a polymeric or other suitable material is injected into separate molds, one for each half of the roller body 40. Once the shaft 56 and the roller body halves 44, 46 have been made, the halves can be snap fitted to each other around the shaft 56, as depicted in FIG. 4. A generally cylindrical roller body 40 results that can pivotally rotate about the shaft 56, which coincides with the roller's axis of rotation. Next, the outer layer 42 can be provided around the roller body 40, as indicated in FIG. 5. In some embodiments, the outer layer 42 is injection molded in place around the outer surface 48 of the roller body 40. In other embodiments, the outer layer 42 is created as a preformed sleeve that is pulled over the roller body outer surface 48. Regardless, the outer layer 42 maintains the two halves 44, 46 of the roller body 40 together. In at least some embodiments, the outer layer 42 is composed of a high-friction material that reduces slip between the rollers 36 and conveyed by the belt objects and/or drive elements that drive the rollers. By way of example, the high-friction material can comprise a rubber or polymeric material.

Figure 6:
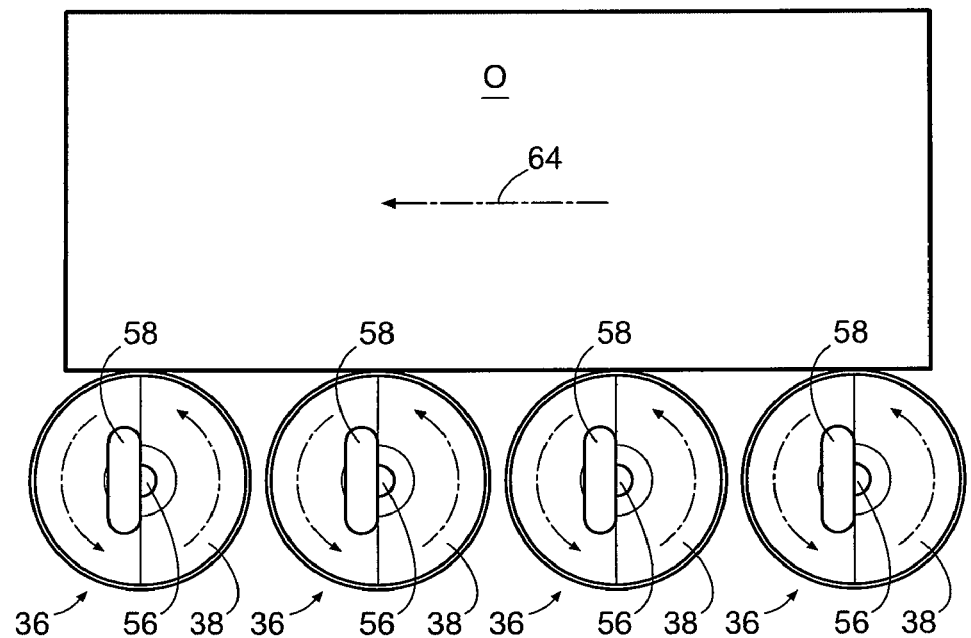
FIG. 6 is a schematic view illustrating diverting an object using rollers of a conveyor belt.

FIG. 6 illustrates use of the rollers 36 in diverting an object, O. In FIG. 6, the components of the conveyor belt beyond the rollers 36 are omitted for purposes of clarity. As indicated in FIG. 6, each roller member 38 rotates in the counterclockwise direction about its shaft 56. Such rotation can be caused using a suitable drive mechanism, such as angled drive rollers (not shown) that are placed beneath the conveyor belt in contact with the roller members 38. Due to the counterclockwise rotation, the object, O, which is supported by the rollers 36, is diverted in the leftward direction identified by arrow 64. Notably, the counterclockwise rotation of the rollers 36 and leftward diversion of the object, O, of FIG. 6 are shown only for purposes of example.

Figure 7:
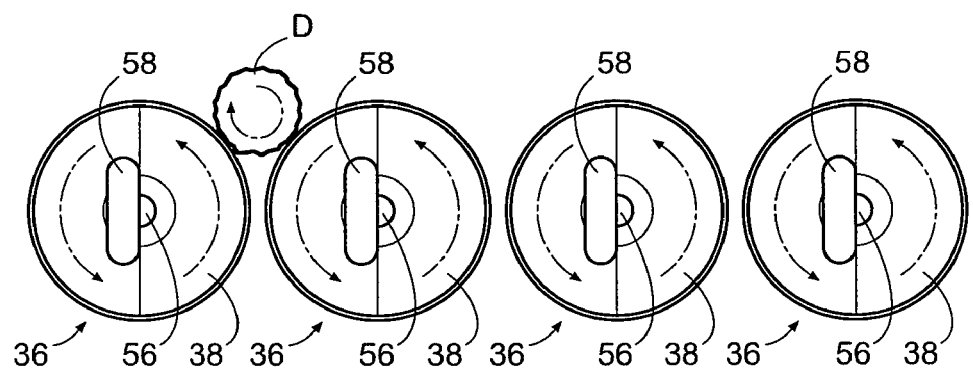
FIG. 7 is a schematic view illustrating preservation of debris that lands on top of rollers of a conveyor belt.

FIG. 7 illustrates a further use scenario for the rollers 36. In this case, however, debris, D, has landed on the conveyor belt adjacent two rollers 36. Given that there is nothing between the two rollers 36, the debris, D, is affected by an upward force on its left side and a downward force on its right side. This can, as indicated in FIG. 7, cause the debris, D, to rotate in place on top of the conveyor belt. Even when such rotation does not occur, however, the debris, D, may not be pulled downward into the conveyor belt due to the opposing forces acting upon it. Notably, such a result is less likely with known conveyor belts that include rollers that are surrounded by belt body sections. Specifically, such belts are more likely to draw down debris given that such debris can be positioned between a downward moving surface of an adjacent roller and a stationary surface of the belt body section. In addition to reducing the likelihood that such debris will be drawn downward into the belt, the arrangement illustrated in FIG. 7 increases operator safety given that appendages, such as fingers, are also less likely to be drawn downward with that arrangement.

Figure 8:
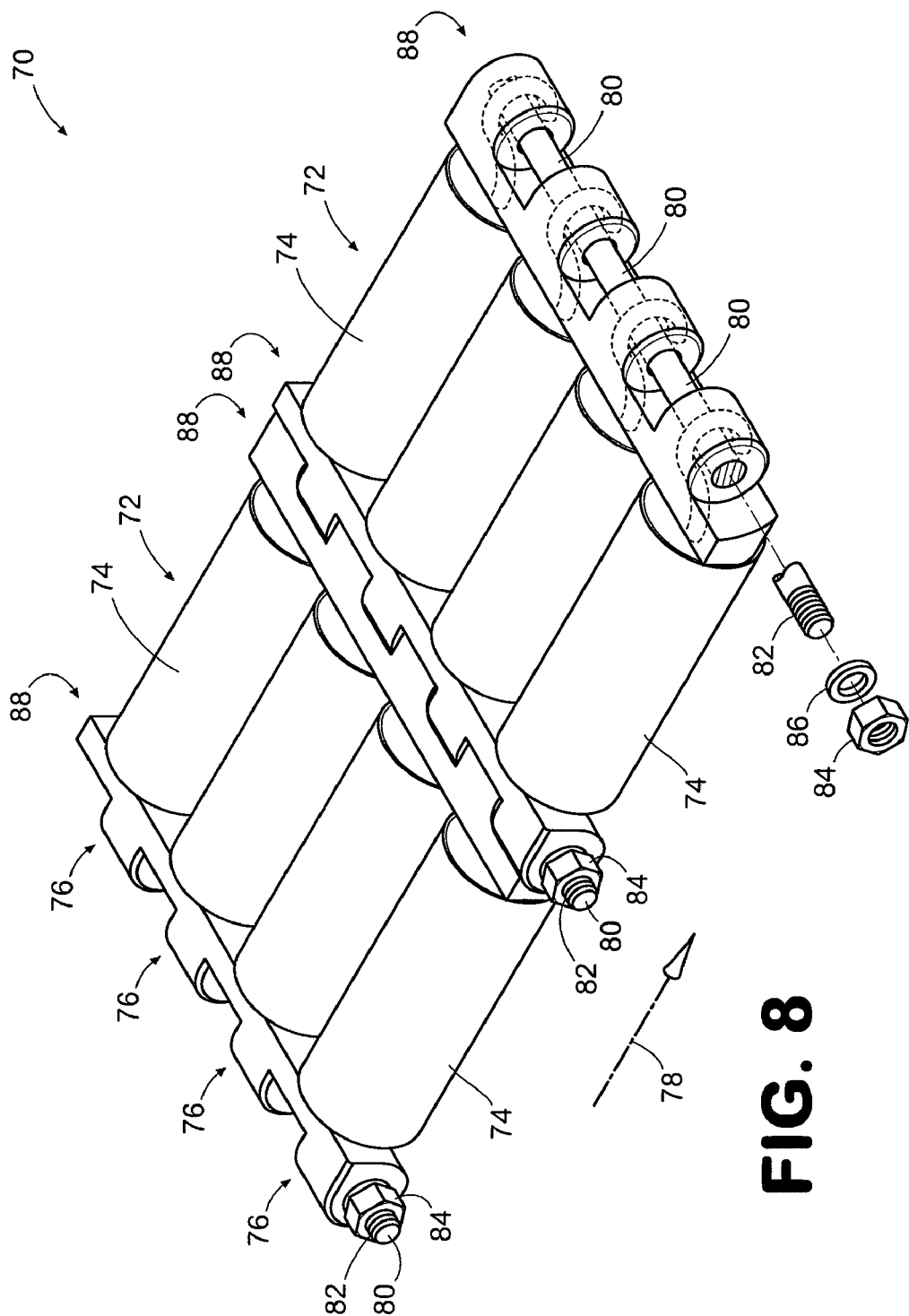
FIG. 8 is a perspective view of a second embodiment of a conveyor belt having rollers that serve as tensile members.

FIG. 8 illustrates a portion of a second embodiment of a conveyor belt 70. As indicated in FIG. 8, the conveyor belt 70 is similar in several ways to the conveyor belt 10 of FIG. 1. Accordingly, the conveyor belt 70 comprises a plurality of transverse rows 72 of rollers 74 that extend across the width of the belt and that receive and transmit tensile forces along the length of the conveyor belt. In at least some embodiments, the rollers 74 also align in columns 76 that extend along a length of the belt 70 parallel to a direction of belt travel identified by arrow 78 (i.e., the longitudinal direction of the belt).

As is further indicated in FIG. 8, the conveyor belt 70 comprises a plurality of transverse shafts 80 that extend across the width of the belt and pivotally connect the various rows 72 of rollers 74 together such that adjacent rows are linked together along the length of the belt to form a continuous or "endless" belt. In some embodiments, the shafts 80 comprise solid elongated rods composed of a metal or plastic material. For example, the shafts 80 can comprise steel rods. As shown in FIG. 8, the ends 82 of the shafts 80 can be threaded so as to be adapted to receive a mating threaded fastener 84, such as a nut. Furthermore, a washer 86 or other spacer element can be positioned between the fasteners 84 and the rollers 74 that they secure.

The transverse shafts 80 also extend through openings provided in longitudinal shafts of the rollers 74. However, in the conveyor belt 70 of FIG. 8, the ends of the shafts 80 are mounted to, for instance embedded in or otherwise surrounded by, spacer members 88 that are adapted to maintain a predetermined spacing between the rollers 74, couple with a matching spacer member of an adjacent row 72 of rollers, and transmit tensile forces. Such an arrangement is illustrated in FIG. 9.

Figure 9:
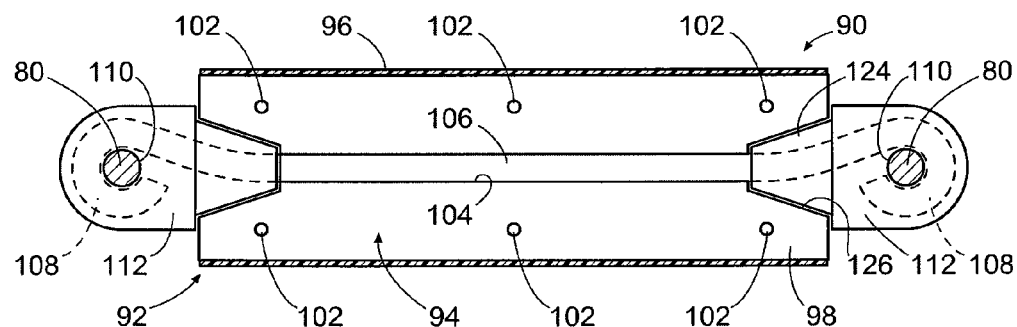
FIG. 9 is a partial cross-sectional side view of an embodiment of a roller and spacer members that can be used in the conveyor belt of FIG. 8.

FIG. 9 illustrates an example roller 90 and spacer members 112 that can be used in the conveyor belt 70 of FIG. 8. As indicated in FIG. 9, the roller 90 comprises a roller member 92 that includes a roller body 94 surrounded by an outer layer 96. As is apparent from FIGS. 10 and 11, the roller body 94 is a generally cylindrical member that is, at least in some embodiments, formed from two longitudinal halves 98 and 100, each comprising a rounded outer surface and a planar inner surface. Therefore, illustrated in FIG. 9 is one of the halves (half 98), as well as connection elements 102 provided thereon.

As indicated in FIG. 9, the roller body half 98 has a groove 104 formed in its inner surface 106 that extends along the length of the roller body half so as to form half of a passage adapted to receive a shaft 106. The shaft 106 comprises an elongated rod or tube having a connection element 108 provided at each end. In at least some embodiments, the connection elements 108 comprise hook elements. Notably, however, the particular nature of the shaft ends is not important as long as those ends provide an element to which the spacer member 112 can connect. In at least some embodiments, the connection elements 108 define openings 110 through which a transverse shaft, such as transverse shaft 80, can pass.

Figure 10:
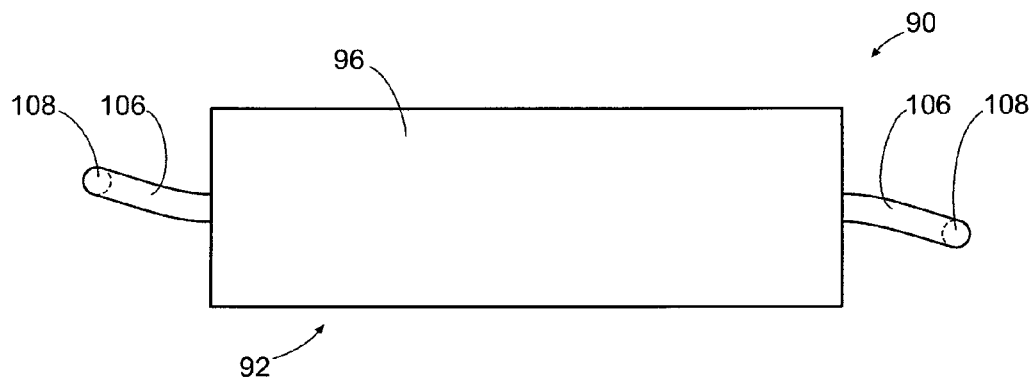
FIG. 10 a top view of the roller shown in FIG. 9.
Figure 11:
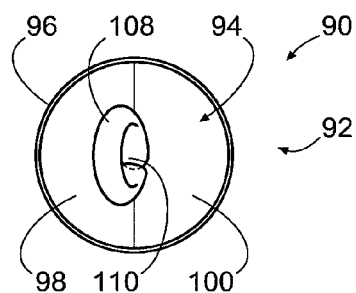
FIG. 11 is an end view of the roller shown in FIG. 9.

Returning to FIGS. 10 and 11, the connection elements 108 of the shaft 106 are offset relative to a longitudinal axis of the remainder of the shaft. As best shown in FIG. 10, the connection elements 108 are offset in opposite lateral directions relative to the remainder of the shaft 106, each of those lateral directions forming an acute angle with the longitudinal axis of the shaft. Such an offset orientation facilitates alignment of the shaft 106 of each roller 90 with the longitudinal direction of the belt in which the roller is used. In such cases, the longitudinal axes of each roller 90 of a column of rollers extending in the longitudinal direction of the belt will generally align with each other.

Figure 12:
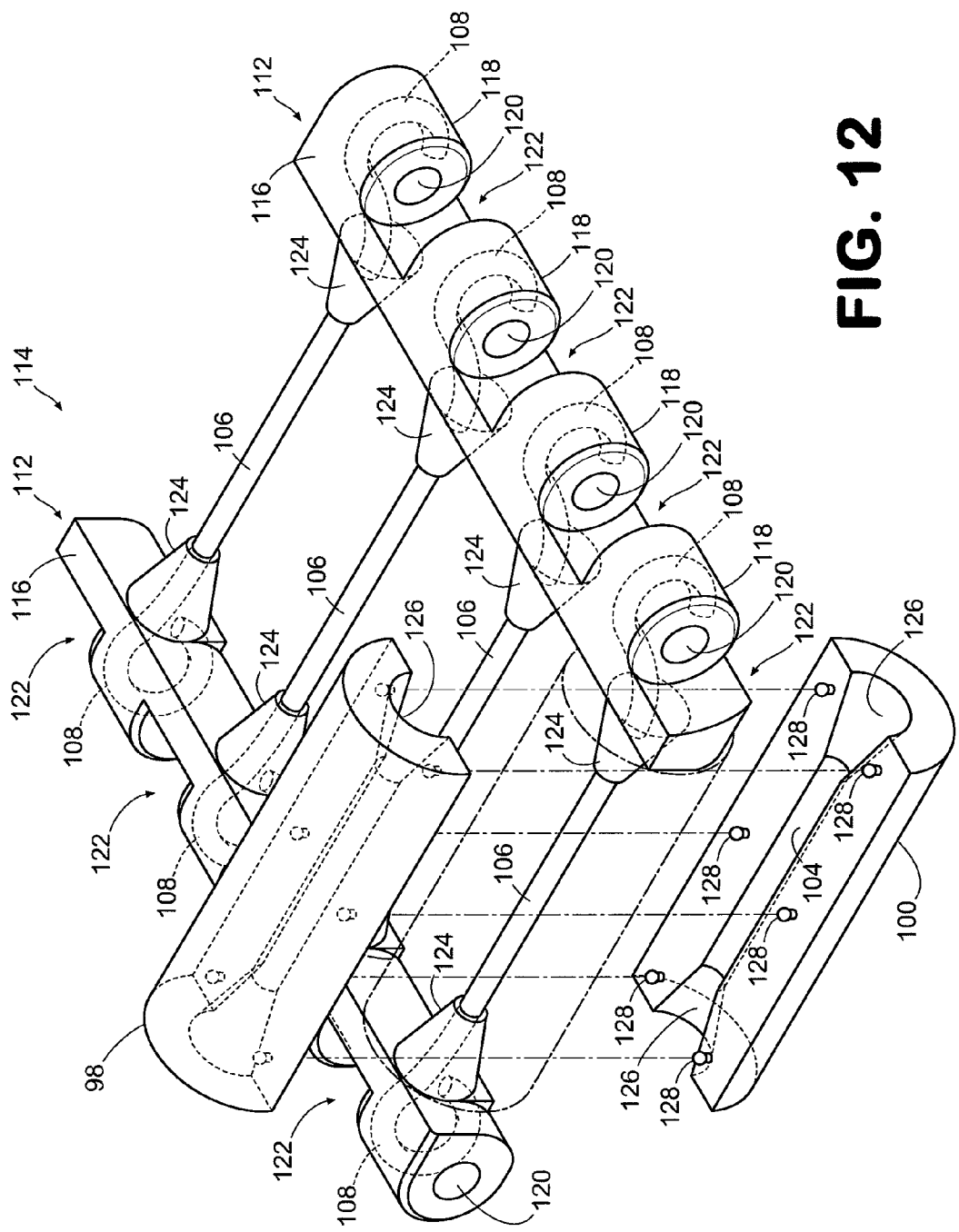
FIG. 12 is a perspective view of a single transverse section of the conveyor belt of FIG. 8, illustrating an embodiment of a method for manufacturing the section.

FIG. 12 illustrates an example method for manufacturing a transverse section 114 of a conveyor belt of the type shown in FIG. 8. The shafts 106 of the belt rollers 90 can first be made by bending the ends of metal rods to form the desired connection elements 108. Once the shafts 106 have been made, they are placed within one or more spacer member molds. A selected material, such as a polymer material, is then injected into the mold(s) so as to at least partially surround or encase one or both ends of the shafts 106 and their respective connection elements 108. In the embodiment shown in FIG. 12, the connection elements 108 are substantially encased within the spacer members 112.

As indicated in FIG. 12, each spacer member 112 can comprise a body portion 116 from which extend collars 118 that encase a major portion of the connection elements 108. Each collar 118 includes a transverse opening 120 through which a transverse shaft, such as shaft 80 shown in FIG. 8, can extend. In cases in which the connection elements 108 are completely encased by the spacer members 112, the transverse shafts will only contact the inner surfaces of the openings 120. Between the collars 118 are gaps 122 that are shaped and configured to receive the collars of an adjacent spacer member 112. Extending from the opposite side of the body portion 116 are support members 124 that surround a portion of the roller shafts 106 to provide structural strength to the transverse section 114. In the embodiment of FIG. 12, the support members 124 are substantially frustoconical.

The two roller body halves 98, 100 can be separately fabricated, for example, using an injection molding process in which a polymeric material is injected into separate molds, one for each half of the roller body 94. As indicated in FIG. 12, the halves 98, 100 can comprise frustoconical grooves 126 that provide space for the support members 124 of the spacer members 112. Once roller body halves 98, 100 have been made, the halves can be snap fitted to each other around the shafts 106 in the manner depicted in FIG. 12. Such snap fitting is facilitated by connection elements 128 provided on each of the halves 98, 100. At that point, a generally cylindrical roller body 94 is formed that may pivotally rotate about the shaft 106, which coincides with the roller's axis of rotation.

Next, the outer layer 96 can be provided around the roller body 94 as indicated in FIG. 9. By way of example, the outer layer 96 is injection molded around the outer surface of the roller body 94 and holds the two halves 98, 100 of the body together. In at least some embodiments, the outer layer 96 comprises a high-friction material that reduces slip between the rollers 90 and conveyed objects and/or drive elements that drive the rollers. By way of example, the high-friction material comprises a rubber or polymeric material.

Once the various transverse sections have been constructed in the manner described above, the various sections can be pivotally connected to each other using transverse shafts, such as shafts 80 in FIG. 8, to form a continuous belt.

In each of the embodiments described in the foregoing, conveyor belt rollers and, more particularly, the shafts of those rollers, act as tensile members of the conveyor belt such that tensile forces imposed upon the belt are received and transmitted by the rollers. With such an arrangement, the conveyor belt body sections normally used to fabricate roller conveyor belts can be omitted. The omission of such body sections enables higher roller densities across the width of the conveyor belt and further reduces the likelihood of objects such as debris or human appendages being drawn down within the conveyor belt during belt operation.

The invention claimed is:

1. A conveyor belt comprising:
a longitudinal direction that coincides with a direction of belt travel; and
a plurality of rollers extending across a width of the conveyor belt, wherein the rollers serve as tensile members of the conveyor belt such that tensile forces imposed upon the conveyor belt along the longitudinal direction are received and transmitted by the rollers and wherein no belt component is positioned between adjacent rollers across the width of the conveyor belt, wherein the rollers comprise longitudinal shafts and roller members that can be rotated about the longitudinal shafts and wherein the longitudinal shafts are aligned with the longitudinal direction of the belt and receive and transmit the tensile forces along the longitudinal direction of the conveyor belt.

2. The conveyor belt of claim 1, wherein the rollers are oriented such that their axes of rotation align with the longitudinal direction of the conveyor belt.

3. The conveyor belt of claim 1, wherein the longitudinal shafts have offset ends that enable adjacent rollers along the longitudinal direction of the conveyor belt to align with each other.

4. The conveyor belt of claim 1, further comprising transverse shafts that extend across a width of the conveyor belt and wherein the rollers pivotally connect to the transverse shafts such that the longitudinal shafts and no other components extend between adjacent transverse shafts along the longitudinal direction of the conveyor belt.

5. The conveyor belt of claim 4, further comprising spacer members provided on the transverse shafts that space adjacent rollers from each other along the width of the conveyor belt.

6. The conveyor belt of claim 1, wherein each roller comprises a roller member having a roller body and a high-friction outer layer provided on an outer surface of the roller body.

7. The conveyor belt of claim 6, wherein each roller body comprises two halves that snap fit together to form the roller body.

* * * * *